2,719,160

PRODUCTION OF FUNGICIDAL CYCLOHEXA-DIENONE DERIVATIVES

Friedrich Becke, Bad Duerkheim, and Oskar Flieg, Limburgerhof (Pfalz), Germany, assignors to Badische Anilin- & Soda-Fabrik Aktiengesellschaft, Ludwigshafen (Rhine), Germany No Drawing. Application December 16, 1952, Serial No. 326,356

Claims priority, application Germany December 19, 1951

4 Claims. (Cl. 260—294.7)

This invention relates to a process for the production of fungicidal products, especially of fungicidal derivatives of cyclohexadienone.

We have found that products having strong fungicidal activity are obtained by reacting hexachlorocyclohexadiene-1(1.4)-one-(3) with compounds containing primary or secondary amino groups.

By the reaction there are probably formed derivatives of 6 - amino - 1.2.4.5.6 - pentachlorohexadiene - (1.4)-one-(3) according to the scheme:

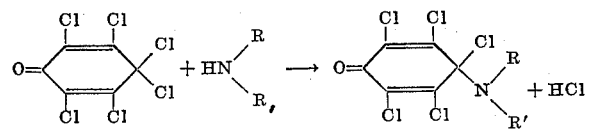

wherein R and R' represent equal or different alkyl, aralkyl, aryl or cycloalkyl groups or may be members of a common ring and R or R' may represent also hydrogen.

Hexachlorocyclohexadiene - (1.4) - one - (3) is obtained, as is well known by exhaustive chlorination of phenol or chlorophenols in the presence of catalysts, such as iron chloride or antimony pentachloride. It is especially advantageous to employ as initial material for the chlorination the chlorophenol mixture which is obtained from hexachlorocyclohexanes by splitting off hydrogen chloride and reaction with alkali or alkaline earth metal hydroxides or alcoholates.

Suitable compounds with primary or secondary amino groups are for example mono- and di-alkylamines, such as methylamine, ethylamine, the propylamines, hexylamines, dimethylamine, diethylamine or methylhexylamine, ethylene diamine, hexylene diamine, cyclohexylamine, dicyclohexylamine, methyl-hexadecyl amine, didocylamine, pyrrolidone, piperidine, morpholine, benzylamine, aniline and N-methylaniline and their homologues and halogen or nitro derivatives, allylamine, diallylamine, methallylcyclohexylamine or the mixture of chloroallylamines obtainable by the reaction of trichloropropane with ammonia, and also hydroxyamines, such as ethanolamine, diaminodipropyl ether, aminoacetaldehyde acetal, glycocoll and its esters, aminoketones, such as paraaminoacetophenone, or aminonitriles, such as ε-aminocapronitrile. Di- and polyamino compounds may react with one or more molecules of hexachlorocyclohexadiene-(1.4)-one-(3).

The reaction is carried out by mixing the reactants, preferably in an indifferent diluent, such as ether, ethanol, benzene, aqueous methanol or low boiling petrol hydrocarbons, and boiling the mixture, if desired, in order to accelerate the reaction.

The new products which are formed in practically quantitative yields can be used in the form of their solutions in organic solvents, in aqueous suspensions or emulsions or in powder or dust form, if desired in admixture with powders, such as talc or kieselguhr. They are extremely active fungicides.

The following examples will further illustrate this invention but the invention is not restricted to these examples. The parts are by weight.

Example 1

A solution of 30.6 parts of N-methallyl-cyclohexylamine in 35 parts of diethyl ether is added to a solution of 30 parts of hexachlorocyclohexadiene-(1.4)-one-(3) in 140 parts of diethyl ether and the mixture is boiled under reflux for 1 hour. The diethyl ether is then distilled off. The residue is dispersed with water and the precipitate formed is filtered off by suction and dried. The yield amounts to 38 parts. The product, according to analysis, has the composition $C_{16}H_{18}ONCl_5$; it melts at 177° to 178° C. and still completely inhibits the growth of aspergillus niger in a dilution of 1:150,000.

Example 2

A solution of 17 parts of piperidine in 35 parts of diethylether is added to a solution of 30 parts of hexachlorocyclohexadiene-(1.4)-one-(3) in 140 parts of diethyl ether. By working up as in Example 1 there are obtained 32 parts of a product having the melting point 234° C. and the composition $C_{11}H_{10}ONCl_5$ which completely inhibits the growth of aspergillus niger in a dilution of 1:100,000.

In a corresponding manner there are obtained with benzylamine a product having the melting point 157° C., with dimethylamine a product having the melting point 222° C., with ethylene diamine a product having the melting point 184° to 186° C. and with pyrrolidine a product having the melting point 225° to 227° C.; all these substances still exhibit complete or extensive growth inhibiting action against aspergillus niger in dilutions of 1:100,000 to 1:200,000.

Example 3

A solution of 60 parts of hexachlorocyclohexadiene-(1.4)-one-(3) in 200 parts of benzene is allowed to flow into a mixture of 120 parts of methanol and 84 parts of a 71% aqueous solution of ethylene diamine while stirring. The reaction mixture is boiled for 1 hour under reflux and the diluent is then distilled off and the residue digested with water and dried. A product is obtained which still completely inhibits the growth of aspergillus niger in a dilution of 1:100,000. By recrystallisation from methanol, 55 parts of a crystalline compound having the melting point 232° C. are obtained which according to analysis contains the radicals of ethylene diamine and of pentachlorocychlohexadienone in the ratio 1:1 corresponding to the composition $C_8H_7ON_2Cl_5$.

If about 200 parts of hexachlorocyclohexadienone be employed, there is obtained a product having the melting point 184° to 186° C. which contains the radicals of the components in the ratio 1:2 and has similar fungicidal effects.

We claim:

1. A process for the production of fungicidal products which comprises heating to reflux a solution of hexachloro-cyclohexadiene-(1,4-one-(3) with a secondary amine selected from the group consisting of pyrrolidine, piperidine, lower dialkylamines and N-methallyl-cyclohexylamine.

2. A fungicidal product obtained by heating to reflux an ethereal solution of hexachlorocyclohexadiene-(1,4)-one-(3) with N-methallyl-cyclohexylamine.

3. A fungicidal product obtained by heating to reflux an ethereal solution of hexachlorocyclohexadiene-(1,4)-one-(3) with piperidine.

4. A fungicidal product obtained by heating to reflux an ethereal solution of hexachlorocyclohexadiene-(1,4)-one-(3) with pyrrolidine.

No references cited.